Oct. 29, 1946.  P. S. JOHNSON ET AL  2,410,288
INSTRUMENT BALANCE WEIGHT
Filed July 29, 1944

Inventors:
Paul S. Johnson,
Joseph W. Dodds,
by Harry E. Dunham
Their Attorney.

Patented Oct. 29, 1946

2,410,288

UNITED STATES PATENT OFFICE 2,410,288

INSTRUMENT BALANCE WEIGHT

Paul S. Johnson, Wakefield, and Joseph W. Dodds, Lynnfield, Mass., assignors to General Electric Company, a corporation of New York Application July 29, 1944, Serial No. 547,252

5 Claims. (Cl. 116—136.5)

1

Our invention relates to improvements relating to the balancing of the moving elements of instruments and, in particular, to a balancing weight in the form of a double wound helix adapted to be resiliently held upon and to be adjustable along an instrument crossarm. We have found that our improved form of balancing weight adds greatly to the flexibility and to the holding power of the weight on the crossarm, but at the same time is more easily adjustable as compared to the single wound helix used heretofore.

Figure 1:
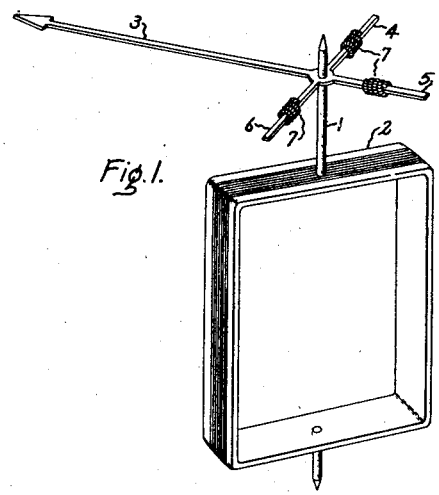
Figure 2:
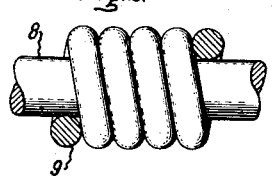
Figure 3:
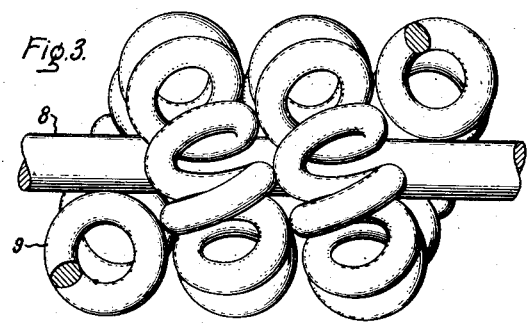
Figure 4:
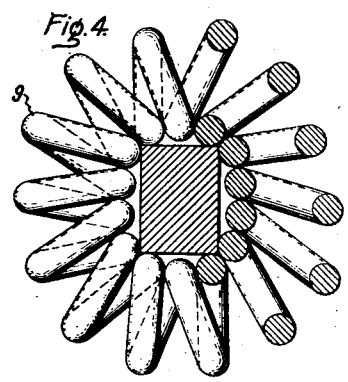

The features of our invention which are believed to be novel and patentable will be pointed out in the claims appended hereto. For a better understanding of our invention, reference is made in the following description to the accompanying drawing in which Fig. 1 represents a typical form of instrument armature with our invention applied thereto; Figs. 2 and 3 are enlarged views representing different stages of manufacture of a weight embodying our invention; and Fig. 4 is an enlarged partially sectioned view of a crossarm with the double helical wound weight applied thereto to illustrate more clearly the improved grasping feature of our weight.

Referring to Fig. 1, 1 represents the vertical shaft and 2 the coil of the armature of an electrical measuring instrument. The armature is provided with a pointer 3 which indicates on a scale, not shown, and as a part of the pointer structure there are arms 4, 5, and 6 extending radially from the shaft upon which adjustable weights 7 are or may be provided as needed. This merely shows one form of a number of instrument devices to which our invention is applicable. Such instrument armatures should be properly balanced and in some instances mechanically tuned to prevent resonant vibration of the pointer element, and the object of the crossarms and weights is for such purposes. Prior art devices of this character are shown in United States Patents No. 1,154,979 and No. 1,449,705.

Such instrument armatures are delicately made, are light in weight, and the shaft thereof is generally mounted in jeweled bearings to reduce friction. The balancing and final adjustment of any weights employed occurs after the armature is mounted in its bearings, and it is important that the weights used be easily applied and adjusted, and that they maintain their positions securely after final adjustment. A form of weight heretofore used for this purpose consists of a single wound helical wire spring as exemplified in the patents previously mentioned.

2

Such prior art weights have certain disadvantages. In order for the single wound helix to have sufficient grasp on the crossarm or pointer to remain in adjusted position indefinitely, it was given a permanent bend and then sprung to a straight or nearly straight helix when mounted on the crossarm. When released, the tendency to return to the original bent form provided grasping power on the crossarm. As a result the helix touched the crossarm at three points, two at the ends of the spiral on one side of the crossarm; and the other point of contact was near the middle of the helix on the opposite side of the crossarm. In some instances this form of weight may bend the crossarm or pointer. Such weights are not very easily adjustable, and in adjusting, considerable care is required so as not to damage delicate armature parts and pivot bearings. Such prior art weights were frequently usable only once. The grasping power of such weights is not as good as desired.

It is the object of our invention to provide an improved adjustable balance weight having, among other desirable features, greatly increased flexibility and grasping power, and one which is much more easily adjusted than the single wound helix of the prior art.

According to our invention we provide weights made of a relatively fine wire and wound as a double helix. This double wound helix can be made at low cost with automatic machinery, but for a better understanding of the construction we will explain the steps thereof as if performed by hand.

In Fig. 2 there is provided a mandrel 8 which for the purposes of a specific illustration may be 0.0085 inch in diameter and which is therefore represented as greatly magnified. On this mandrel is tightly wound a suitable wire, such as a nickel silver or phosphor bronze spring wire 9, 0.005 inch in diameter, to form a single wound helix as represented in Fig. 2. Except for the size of wire used, such a single wound helix is essentially the form of weight used according to the prior art. The single wound helix thus obtained is slid off the mandrel 8 and then rewound as a double helix on the same mandrel or one of approximately the same diameter as represented in Fig. 3. Sufficient tension is maintained in this second winding operation with the convolutions of the double helix close together that when removed from the mandrel 8, Fig. 3, the double wound helix retains essentially the same form and slightly greater size than as represented in Fig. 3. For instance, it may have an inside diameter of 0.0127 inch and an outside diameter of 0.05 inch. As previously mentioned, this double wound helix may be, and preferably is, formed with automatic machinery as a continuous process in long lengths and at low cost. When finished, the double wound helix is cut into appropriate lengths such as a length having from three to eight large convolutions, which are then ready for use as instrument balancing weights. Such weights are represented at 7 in Fig. 1.

The cross section of the crossarm or pointer or other arm on which such weights are used may have almost any shape. Generally it is desirable from a manufacturing standpoint to make the crossarms of rectangular shape as represented in Fig. 4. Also the average diameter or circumference of the crossarm may vary somewhat for a given size of double wound helix weight, since with the greatly increased flexibility of this new weight, these relative dimensions and the shape of the crossarm are not so exacting as with single wound helix weights of the prior art.

The double wound helical weight is shown partially in cross section as mounted on a crossarm of rectangular cross section in Fig. 4. The relative dimensions may be such that when the weight is slid onto the crossarm, there is an expansion of the average diameter of the weight by six per cent or more. For the dimensions previously given the crossarm may have a cross section of 0.012 x 0.016 inches. While Fig. 4 may not be an exactly correct representation due to the very small dimensions involved, it is believed to be fairly representative of the manner in which the flexible weight makes contact with a crossarm of the shape represented, when there is a small amount of stretching and expansion of the double helix incident to sliding it onto the crossarm. It is to be noted that the strands of the weight make contact on each side of and adjacent to each corner of the crossarm. This of course is repeated for all convolutions of the weight, so that for a weight with six convolutions about the crossarm there would be at least 48 points of contact as compared to, at the most, six points of contact with a single helix weight as taught by Patent No. 1,154,979, when used on a rectangularly shaped crossarm. With a circular crossarm the complete inner periphery of the double helical weight would make contact, whereas with the single helical weight of the prior art there would be three points of contact of very small area.

It will now be apparent that with very slight tension on the double helical weight it nevertheless has a large contact holding surface with the crossarm and, hence, does not easily get out of place after adjustment. Its great flexibility permits such contact with crossarms of almost any shape. The crossarm axis may be curved without causing any difficulty. The relative dimensions of internal diameter of weight and external diameter or size of crossarm are much less exacting than heretofore, which is quite important because of the difficulty and cost of obtaining exacting sizes in dealing with the small dimensioned parts here involved. The new form of weight has no tendency to bend the crossarm or other member on which it is mounted, and can be quite easily adjusted and replaced without placing undue strain on delicate pivots and other parts. A weight which has been removed from a crossarm can be used over again. The new weight has a greater weight per unit length than the single helix weight, and thus, a correspondingly shorter length can be used with correspondingly greater range of adjustment along a crossarm of given length.

The factors of flexibility, weight per unit length, and size may be varied. For instance, we may use 0.007 inch wire wound on a 0.009 inch mandrel to form the single helix, and then rewind on a 0.012 inch mandrel and produce weights having inside diameter of 0.0145 inch and outside diameter of 0.059 inch. Decreasing the size of wire used and increasing the inner and outer diameters increase flexibility. Increasing the size of wire used increases the weight per unit length as does also increasing the ratio of outside diameter to inside diameter.

What we claim as new and desire to secure by Letters Patent of the United States is:

1. A weight for instrument crossarms and the like, comprising a double helix made of spring wire formed by first winding the wire on a round arbor to form a closely wound first helix, and winding the first helix on a round arbor of approximately the same diameter as the first arbor to form the double helix.

2. A weight for instrument crossarms and the like, comprising a double helix formed by a single piece of spring wire less than 0.006 inch in diameter.

3. A weight for instrument crossarms and the like, comprising a helix wound from a spring wire helix, the two helices having approximately the same internal diameter and the wire being of a less diameter.

4. A weight for instrument crossarms and the like, comprising a helix wound from a spring wire helix, the internal diameters of said helices being less than 0.01 inch and the spring wire being less than 0.006 inch in diameter.

5. In a measuring instrument, an armature having a balancing crossarm and a weight adjustable along said crossarm, comprising a first helix made from spring wire and a second helix formed from the first helix, the internal diameter of said second helix being such as to necessitate slight expansion of said second helix when the same is threaded into the crossarm.

PAUL S. JOHNSON.
JOSEPH W. DODDS.